Feb. 21, 1967 Y. LE MASSON 3,305,423
METHOD OF MAKING AN ISOTHERMAL GARMENT
Filed Nov. 20, 1963
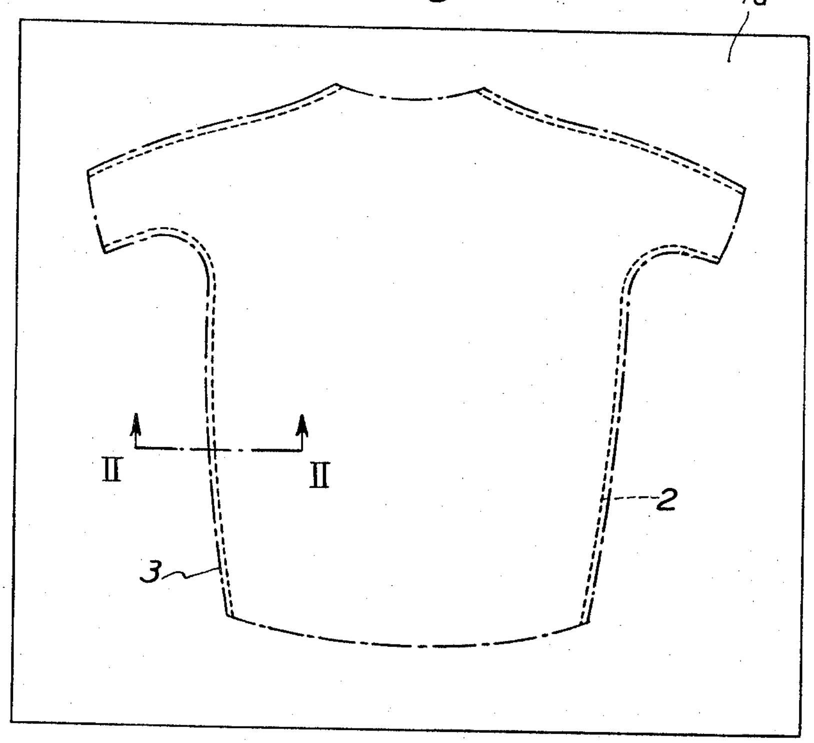
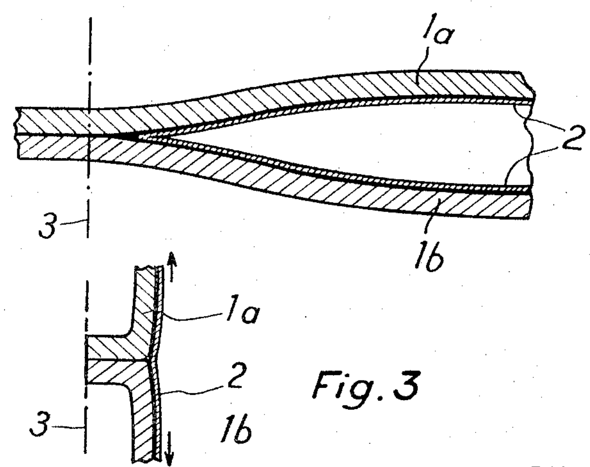
INVENTOR
YVES LE MASSON
BY Hammond and Littell
ATTORNEYS United States Patent Office 3,305,423

Patented Feb. 21, 1967

3,305,423

METHOD OF MAKING AN ISOTHERMAL GARMENT

Yves Le Masson, L'Ile-Saint-Denis, France, assignor to Michel Piel, Paris, France Filed Nov. 20, 1963, Ser. No. 325,081
Claims priority, application France, Nov. 22, 1962, 916,223
5 Claims. (Cl. 156—267)

One method of manufacturing isothermal garments for water and underwater sports consists in making such garments out of a composite material comprising a sheet of cellular rubber of the "foam" type, i.e. having closed cells, that is lined on at least one of its sides with a fabric that is elastic in all directions. Provided such a fabric adheres in a uniform and homogeneous fashion to the cellular rubber, it will reinforce the latter and impart to it a smooth sheen and eye-appeal.

The composite garment is made by assembling together elements cut from such a sheet, with the fabric constituting the inner face of the garment.

The present invention relates to a method of bonding an elastic fabric to cellular rubber and to a method of manufacturing isothermal garments for which such a bonding method is particularly suited.

The bonding of an elastic fabric to cellular rubber is a delicate operation, since the methods employed to obtain cellular rubber with closed cells exclude any possibility of producing the composite material directly. It is therefore necessary to start with a sheet of finished, and hence vulcanized, cellular rubber, and a bare fabric consisting usually of a nylon fabric elastic in all directions. Elastic glues best capable of adhering alike to nylon and cellular rubber are rubber solutions. For such solutions to dry and vulcanize, they must lose their solvent, so that the normal way to use them is to coat separately the two faces to be bonded together, allow the solvent to evaporate and then apply the two coated faces against each other.

Unfortunately, this method is ill-suited to the bonding of fabric to cellular rubber because it is impossible to coat a fabric with solution directly without the fabric absorbing the solution and thereby losing all its elasticity. An effective though costly method consists in rubber-coating the fabric while it is being woven, since such prior coating will allow absorption-free bonding.

Another method consists in coating only the cellular rubber and in applying the fabric thereagainst before evaporation of the solvent. Since the meshes are permeable to air, evaporation can continue. However, depending on the state of evaporation at the time of applying the fabric against the previously adhesive-coated rubber, there will be either a certain degree of absorption by the fabric (if evaporation has been inadequate), or poor bonding (if evaporation has gone too far). The inevitable lack of homogeneity in the adhesive coating, due primarily to the fact that the coated surface, which is usually slit (the cells are apparent), absorbs the coating and the solvent in greater or lesser degrees, makes either of these extremes inevitable.

The bonding method according to this invention, which overcomes these drawbacks, consists in coating solely the cellular rubber in the normal way, on a preferably slit side thereof, and in allowing the adhesive to dry completely, which adhesive then becomes devoid of surface stickiness. However, since the rubber constituting the dry extract of the adhesive has not yet become vulcanized, it can be softened and made tacky by heating to 100° C., for example. The fabric is then spread over the dry adhesive and the whole compressed under heat between the two plates of a press. The pressure per square centimetre is to the order of a few kilograms and the pressing time a few seconds. The adhesive is thus softened and made tacky and clings strongly to the fabric without being absorbed by the latter. An advantage of this method is that it in no way reduces the elasticity of the fabric, and any variations in homogeneity of the coating have for all practical purposes no effect on the final result, which always remains uniform. Lastly, the fact that the operations of coating and assembling are made clearly distinct of each other enables each to be carried out more efficiently.

The method of manufacturing isothermal garments, to which the bonding method hereinbefore described is particularly well-suited, consists in directly gluing the garment initially madeup from the elastic fabric between two sheets of cellular rubber, the inner faces of the slit sheets of cellular rubber having first been coated with rubber solution left to dry.

The description which follows with reference to the accompanying non-limitative exemplary drawing will give a clear understanding of how the subject method of this invention can be carried into effect.

Referring to the drawing filed herewith:

FIGURE 1 shows in elevation the garment made of elastic fabric and the coated cellular rubber pressed together under heat.

FIGURE 2 is a section taken through the line II—II of FIGURE 1, the two sides of the garment being shown separately for greater clarity, and FIGURE 3 is a view similar to FIGURE 2 subsequent to cutting, the two sides being subjected to tension.

To manufacture a garment according to this invention, two sheets of cellular rubber 1*a* and 1*b* are coated with a rubber solution, which is allowed to dry completely. A short-sleeved vest 2 of extensible fabric is then sewn together or fully knit in such manner that it can be spread flat without creasing. This vest is then laid out flat and sandwiched between the two coated faces of the two sheets of foam rubber, the whole being then pressed together under heat for a few seconds. As the composite material heats up, the adhesive softens and becomes tacky, the portions 1*a* and 1*b* applied against the vest or like garment adhering thereto without traversing it, and the portions projecting beyond the vest adhering to each other. Thus the vest remains hollow, as it were, i.e. the back portion for instance adheres solely to the sheet 1*a*, while the front portion adheres solely to the sheet 1*b*. Beyond the marginal folds of the vest, the portions 1*a* and 1*b* are bonded directly to each other.

On being withdrawn from the press, the bonded assembly is cut out along the dot-dash line 3 whereby to open up the neckline, the sleeves and the bottom of the vest yet leave a margin of a few millimetres beyond the marginal folds.

The inside of the garment is thus constituted from an unbroken fabric, the outer rubber sheathing being interrupted only level with the folds, i.e. at the points where the sheets 1*a* and 1*b* are bonded to each other directly to form a bead or seam of width equal to the margin left between the inner fold and the cutout line 3.

Reference to FIGURE 3 clearly shows the internal continuity of the garment and the external seam when a pull is exerted. Such a garment manufacturing process thus calls only for a single pressing operation.

It is, of course, to be clearly understood that while we have described and illustrated the preferred embodiment of our invention, many modifications can be made thereto without departing from the spirit and scope of the invention.

What is claimed is:

1. A method of manufacturing of an isothermal garment comprising the steps of coating a face of each of two sheets of elastically resilient cellular rubber with an adhesive rubber solution, allowing said adhesive rubber solution to dry substantially to give sheets of rubber having a substantially dry adhesive rubber coating, laying out flat on one of said coated sheets of rubber a garment of fabric elastic in all directions, said fabric garment being adaptable to encompass a human body, applying the other of said coated sheets of rubber on top of said fabric garment so that both of said coated faces of said sheet of rubber are adjacent said fabric garment, said sheets of rubber being of sufficient dimension to overlap said fabric garment and applying pressure to the assembly while at the same time softening said substantially dry adhesive rubber coating whereby said fabric garment is bonded to said sheets of rubber and said sheets of rubber which overlap said fabric garment are bonded together.

2. The method of claim 1, wherein said substantially dry adhesive rubber coating is softened by heating.

3. The method of claim 1, wherein said bonded sheets of rubber which overlap said fabric garment are trimmed of the excess of the overlapping portion.

4. A method of manufacturing of an isothermal garment comprising the steps of coating both faces of each of two sheets of elastically resilient cellular rubber with an adhesive rubber solution, allowing said adhesive rubber solution to dry substantially to give sheets of rubber having a substantially dry adhesive rubber coating, laying out flat on one of said coated sheets of rubber a garment of fabric elastic in all directions, said fabric garment being adaptable to encompass a human body, applying the other of said coated sheets of rubber on top of said fabric garment so that both of said coated faces of said sheet of rubber are adjacent said fabric garment, said sheets of rubber being of sufficient dimension to overlap said fabric garment, applying a flat piece of fabric which is elastic in all directions to each of the exposed coated faces of said two sheets of rubber whereby a sandwich of fabric, sheet of rubber, fabric garment, sheet of rubber and fabric is formed, applying pressure to the assembly while at the same time softening said substantially dry adhesive rubber coating whereby said fabric garment is bonded to said sheets of rubber and said sheets of rubber which overlap said fabric garment are bonded together and trimming off said excess of said bonded sheets of rubber which overlap said fabric garment.

5. The isothermal garment produced by the process of claim 1.

References Cited by the Examiner

UNITED STATES PATENTS

| | | | |
|---|---|---|---|
| 2,792,320 | 5/1957 | Bower. | |
| 2,981,954 | 5/1961 | Garbellano | 2—2.1 |
| 3,028,279 | 4/1962 | Heberlein | 156—160 |

EARL M. BERGERT, *Primary Examiner.*

D. J. DRUMMOND, *Assistant Examiner.*